US011705722B2

United States Patent
Steynberg

(10) Patent No.: US 11,705,722 B2
(45) Date of Patent: Jul. 18, 2023

(54) METHOD FOR PROTECTING LINES IN WHICH A REACTOR DEVICE FOR REACTIVE POWER COMPENSATION IS PROVIDED ON AN ELECTRICAL LINE AND PROTECTION ASSEMBLY INCLUDING A REACTOR DEVICE FOR REACTIVE POWER COMPENSATION

(71) Applicant: SIEMENS AKTIENGESELLSCHAFT, Munich (DE)

(72) Inventor: Friedemann Gustav Steynberg, Igensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 107 days.

(21) Appl. No.: 17/329,376

(22) Filed: May 25, 2021

(65) Prior Publication Data
US 2021/0367421 A1    Nov. 25, 2021

(30) Foreign Application Priority Data

May 25, 2020    (EP) .................................... 20176256

(51) Int. Cl.
*H02H 7/26*    (2006.01)
*H02H 1/00*    (2006.01)

(52) U.S. Cl.
CPC ............ *H02H 7/26* (2013.01); *H02H 1/0007* (2013.01)

(58) Field of Classification Search
CPC ........ G01R 17/02; G01R 19/10; G01R 31/08; H02H 1/0007; H02H 3/006; H02H 3/02;
(Continued)

(56) References Cited

U.S. PATENT DOCUMENTS

| 7,936,093 B2 * | 5/2011 | Kinoshita | H01H 9/563 307/127 |
| 8,744,637 B1 | 6/2014 | Maragal | |
| 2022/0037879 A1 * | 2/2022 | Stanek | H02H 3/066 |

FOREIGN PATENT DOCUMENTS

| CH | 701585 B1 | 2/2011 |
| EP | 3629437 A1 | 4/2020 |

(Continued)

OTHER PUBLICATIONS

Siemens AG 2016, Energy Management Division: "SIPROTEC 5 Protection, automation, and monitoring", EMDG-810022-00-7600,2016, XP002800769, found on the Internet: URL:https://www.downloads.siemens.com/download-center/download?DLA09_248 [retrieved Oct. 21, 2020].

(Continued)

*Primary Examiner* — Jared Fureman
*Assistant Examiner* — Nicolas Bellido
(74) *Attorney, Agent, or Firm* — Laurence A. Greenberg; Werner H. Stemer; Ralph E. Locher

(57) ABSTRACT

In a method for protecting lines, in which a reactor device for reactive power compensation is provided on an electrical line, a resonant current is measured on the line side of the reactor device by a first measuring device after an opening of a circuit breaker. A voltage is measured by a second measuring device after the opening of the circuit breaker. A current in the reactor device is calculated by an evaluation device on a basis of the measured voltage, and the calculated current is subtracted from the measured resonant current by the evaluation device in order to obtain a corrected current.

10 Claims, 3 Drawing Sheets

(58) Field of Classification Search
CPC .. H02H 7/26; H02J 3/1821; H02J 3/20; H02J 3/16; H02J 3/18; H02J 3/1871; Y02E 40/30
See application file for complete search history.

(56) References Cited

FOREIGN PATENT DOCUMENTS

| | | | |
|---|---|---|---|
| WO | 2017045044 A1 | 3/2017 | |
| WO | WO-2017045044 A1 * | 3/2017 | ............. G01R 31/08 |

OTHER PUBLICATIONS

Siemens AG, Energy Management Division: "SIPROTEC 7SD87 Combined line differential and distance protection" SIPROTEC 7SD87 Steckbrief E7.8.docx, Aug. 2018 (Aug. 2018), XP002800770, found on the Internet: URL:https://www.downloads.siemens.com/download-center/Download.aspx?pos=download&fct=getasset&mandator=ic sg&id1=DLA07_1698 [retrieved Oct. 21, 2020].

* cited by examiner

METHOD FOR PROTECTING LINES IN WHICH A REACTOR DEVICE FOR REACTIVE POWER COMPENSATION IS PROVIDED ON AN ELECTRICAL LINE AND PROTECTION ASSEMBLY INCLUDING A REACTOR DEVICE FOR REACTIVE POWER COMPENSATION

CROSS-REFERENCE TO RELATED APPLICATION

This application claims the priority, under 35 U.S.C. § 119, of European patent application EP 20176256.4, filed May 25, 2020; the prior application is herewith incorporated by reference in its entirety.

BACKGROUND OF THE INVENTION

Field of the Invention

The invention relates to a method for protecting lines in accordance with the precharacterizing clause of the independent method claim and a protection assembly in accordance with the precharacterizing clause of the independent protection assembly claim.

Typically, a reactor device is installed on relatively long overhead lines and cables in order to compensate for a capacitive reactive current on the line. If a current transformer is installed on the line side of the reactor, a decaying resonant current is measured after the opening of a circuit breaker. This resonant current has a disadvantageous effect on functions of the protective equipment which evaluate the interrupting current. The functions are, for example, termination of the off command and breaker failure protection. Until now, this problem has been solved by virtue of a set value for the minimum current when the circuit breaker is open being set to a correspondingly high value for the protective equipment. As a result, the current threshold is also set to be correspondingly high for the breaker failure protection. Thereby, both functions of the protective equipment are markedly restricted in terms of their sensitivity, however.

The brochure "SIPROTEC 7SD87 Leitungsdifferentialschutz" [SIPROTEC 7SD87 Line Differential Protection], Siemens AG 2018 discloses an expansion module for line protection. This expansion module can be combined with protective equipment known from the brochure "SIPROTEC 5 Schutz, Automatisierung and Uberwachung" [SIPROTEC 5 Protection, Automation and Monitoring], Siemens AG 2016, Article No.: EMDG-B10022-00.

BRIEF SUMMARY OF THE INVENTION

The invention is based on the object of specifying a method for protecting lines which provides a comparatively high level of safety for the line protection.

The invention achieves this object by a method as claimed in the independent method claim.

For example, the reactor device may be a reactor coil, which may be configured for a plurality of phases. In the text which follows, the terms reactor, reactor coil and reactor device are used synonymously. This inductance is used correspondingly for capacitive reactive power compensation.

For example, the line may be configured for three-phase AC voltage, with the result that the reactor device and the measuring devices are also configured for three phases. The line may be, for example, a high-voltage line such as, for example, an overhead line having a rated voltage of over 52 kV.

The invention uses the measured voltage to calculate the current in the reactor and then determines a calculated current at the circuit breaker by subtraction. After opening of the circuit breaker, the calculated current is not subjected to the compensation current in the reactor. This enables a lower tripping sensitivity of the protective equipment in respect of its functions such as, for example, disconnection of a grid section and breaker failure protection, which increases the safety of the operation of the line or the power supply system.

The calculated current can be used to set the current threshold for determining the open state of the circuit breaker sensitively, as usual. The restrictions which are caused by the installation of a current transformer on the line side of the reactor coil are eliminated.

The first measuring device can have, for example, a current transformer, and the second measuring device can have, for example, a voltage transformer.

The first and the second measuring device may be, for example, separate measuring equipment. However, as an alternative, a single item of measuring equipment can also be used which combines both functions, namely current and voltage measurement. This has the advantage that the voltage and current values are each present at the same times, for example with the same time stamps, without synchronization between the first and second measuring devices being necessary.

The output values of the measuring devices can be transmitted, for example by a process bus, to the evaluation device and/or the protection device. Alternatively, another digital data transmission method can be used.

A computer having processor and data storage means can be used as evaluation device. The evaluation device can, however, also be implemented using software and can be designed as a function in the protection device, which has dedicated processor and data storage means.

In one variant, the first and second measuring devices can be part of the protection device. In a development, the evaluation device can also be part of the protection device.

A resonant current within the meaning of the invention is an electrical current which can be measured for a short period of time on disconnection of the line and decays over time.

In a preferred embodiment of the method according to the invention, the corrected current is used by a protection device as input variable for line protection functions. This is an advantage because the falsifying influence of the reactor coil can be eliminated.

In a preferred embodiment of the method according to the invention, a threshold value for determining the open state of the circuit breaker is used for the protection device, wherein the threshold value is lower than in the case of the use of the measured resonant current as input variable. This is an advantage because a higher tripping sensitivity of the protection device and therefore improved safety can thus be achieved.

In a preferred embodiment of the method according to the invention, a main reactor shunt and a neutral reactor shunt are used for the reactor device.

In a preferred embodiment of the method according to the invention, the current in the reactor device is determined for each phase in each case by an analysis of symmetrical components. This is an advantage because it is a simple and tested method.

In addition, the invention has the object of specifying a protection assembly which provides a comparatively high degree of safety for the line protection.

The invention achieves the object by a protection assembly as claimed in the independent protection assembly claim. Preferred embodiments result from dependent claims. In this case, the same advantages accordingly result as explained at the outset for the method according to the invention.

Furthermore, the invention is based on the object of specifying a method with which the safety in the power supply system can be further increased.

The invention achieves this object by a method for protecting lines, in which a reactor device for reactive power compensation is provided on an electrical line, and a first current is measured on the line side of the reactor device by means of a first measuring device in the closed state of a circuit breaker. The invention is characterized in that a voltage is measured by a second measuring device in the closed state of the circuit breaker, and in that a current in the reactor device is calculated by means of an evaluation device on the basis of the measured voltage, and the calculated current is subtracted from the measured first current by means of the evaluation device in order to obtain a corrected current.

In this alternative configuration of the invention, the (first) current (in this case therefore not a resonant current) and the voltage can also be measured prior to opening of the circuit breaker, i.e. in the closed state, in each case for each phase in order to calculate a corrected current.

In a preferred embodiment, the corrected current is used by a protection device as input variable for further protection functions.

In a preferred embodiment, a threshold value for tripping the further protection function is used for the protection device, the threshold value is lower than in the case of the use of the first current as input variable. The further protection function may be, for example, fault localization and/or distance protection. This is an advantage because, by means of the more precise detection of the current in accordance with the invention, improved results for the mentioned further protection functions and therefore an increased level of safety in the power supply system can be achieved.

In order to further explain the invention, schematic illustrations are shown in the drawings.

DETAILED DESCRIPTION OF THE INVENTION

Figure 1:
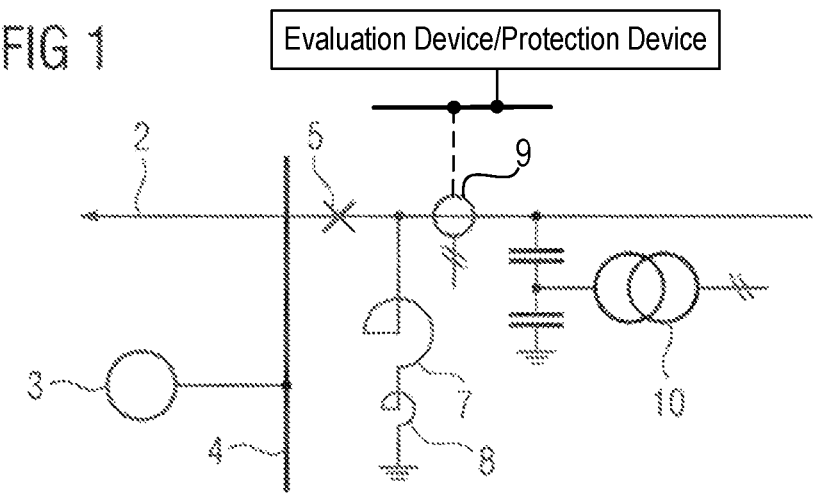
FIG. 1 is an illustration showing a first power supply system.

Referring now to the figures of the drawings in detail and first, particularly, to FIG. 1, there is shown a so-called single-line illustration (single-phase illustration) 1 of an electrical line 2 with a length of 360 km. An injection of electrical power 3, for example a photovoltaic installation, is provided on a busbar 4. A reactor coil 7 and 8 are arranged downstream of a circuit breaker 5 along the line 2. The reactor coil has a so-called main reactor shunt 7 and a so-called neutral reactor shunt 8. A current transformer 9, as a first measuring device, is arranged downstream of the reactor coil 7, 8 on the line side. The current transformer 9 measures a resonant current which can assume, for a short period of time, a comparatively high value in the case of such long lines owing to resonance effects on opening of the circuit breaker 5. This current value may be above a tripping threshold of protective equipment, with the result that the protective equipment cannot perform certain protection functions such as, for example, breaker failure protection.

Figure 2:
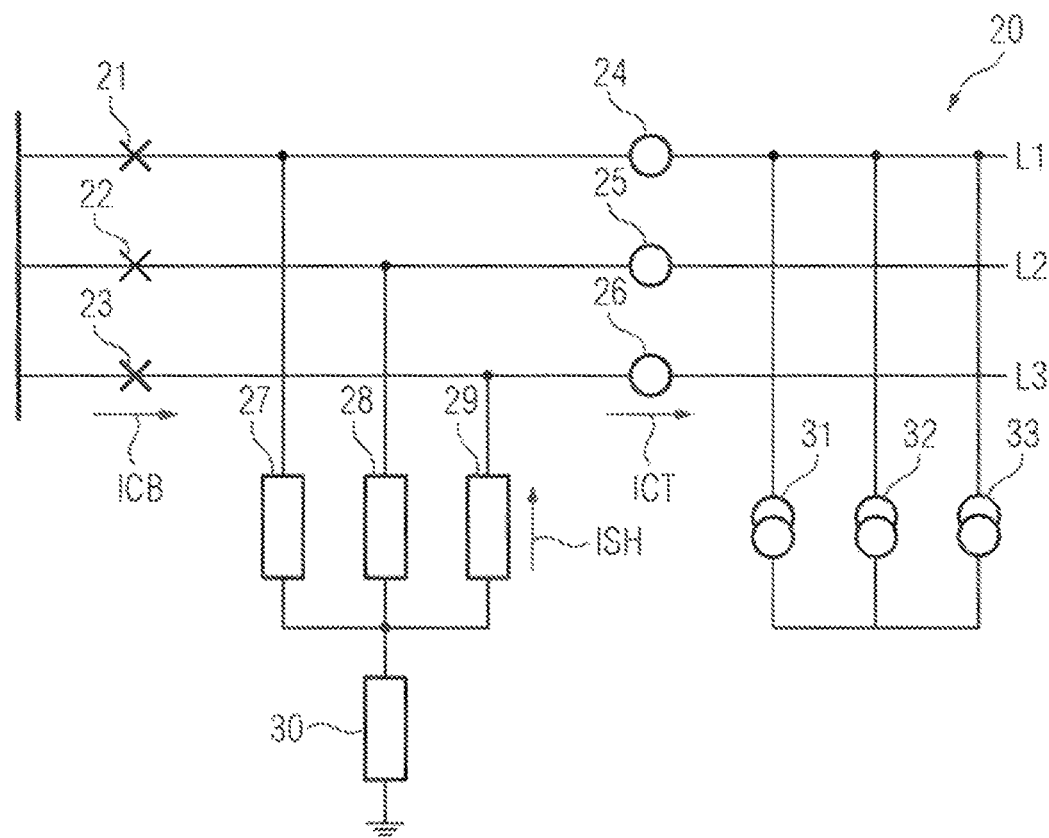
FIG. 2 is an illustration showing a second power supply system.

The invention proposes arranging a voltage transformer 10, which operates capacitively, for example, or a second measuring device on the line 2 (on the line side in relation to the circuit breaker, illustrated on the right in FIG. 2) in order to measure a voltage present in the reactor coil. On the basis of this voltage, a conclusion can be drawn in each case on the current in the reactor, and this current can be used for correcting the measured resonant current.

The following values result, for example:

| | i. Main Reactor | Neutral Reactor |
|---|---|---|
| Reactor inductance (Ω) | 1600 | 1225 |
| Reactor apparent power (Mvar) | 100 | 100 |

When the circuit breaker is opened, the current which is measured in the first measuring device corresponds to the current flowing through the reactor coil. As a result, tripping of a protection device can be terminated with a delay if this measured current is greater than the threshold value for the determination of the disconnected state of the line 2 by the protection device (for example 50 mA).

For this reason, the invention proposes correcting the measured current by computation by virtue of a calculated current flow through the reactor coil being subtracted from the measured current. This current flow through the coil is calculated on the basis of a voltage measurement by means of a voltage transformer as second measuring device. The voltage transformer is arranged on the line side in relation to the circuit breaker. In addition, a calculated impedance of the reactor coil is used for the calculation.

An equivalent circuit diagram 20 to the single-line diagram in FIG. 1 is illustrated in FIG. 2 with three phases. Each phase L1, L2, L3 has a circuit breaker 21, 22, 23, wherein the sought actual current $I_{CB}$ is present for each phase in the circuit breaker (indicated by an arrow for phase L3). In addition, each phase has an ammeter 24, 25, 26, at which in each case the measured current $I_{CT}$ can be established. The voltage is measured using a voltmeter 31, 32, 33 for each phase. The reactor coil 27-30 has a first part for the so-called main reactor with one coil 27, 28, 29 per phase, wherein the current $I_{SH}$ to be calculated flows here. Furthermore, a so-called neutral reactor 30 is provided.

The current $I_{CB}$ at the circuit breaker can be calculated (for one of the phases) as follows:

$$I_{CB} = I_{CT} - I_{Sh}.$$

The phase voltage is used for calculating $I_{SH}$:

$$V_{Ph} = I_{Sh\_N} \cdot ZN_{Sh} + I_{Sh} \cdot ZL_{Sh}.$$

In order to solve the divided currents into $ZN_{SH}$ and $ZL_{SH}$, so-called symmetrical components are analyzed for the reactor coil. The analysis of symmetrical components is a conventional method in electrical engineering and is known from, for example, Wikipedia (permanent link: de.wikipedia.ord/w/index.php?title=Symmetrische Komponenten&oldid=198714718).

$$I_{Sh\_A} = I1 + I2 + I0$$

The following results for phase A:

$$I_{Sh\_A} = \frac{V1}{Z_{sh}} + \frac{V2}{Z_{sh}} + \frac{V0}{3 \cdot ZN_{sh} + Z_{sh}}$$

$$I_{CB\_A} = I_{CT\_A} - \left(\frac{V1}{Z_{sh}} + \frac{V2}{Z_{sh}} + \frac{V0}{3 \cdot ZN_{sh} + Z_{sh}}\right)$$

Correspondingly, the currents at the circuit breaker can also be calculated for the other two phases B, C on the basis of an analysis based on symmetrical components.

Figure 3:
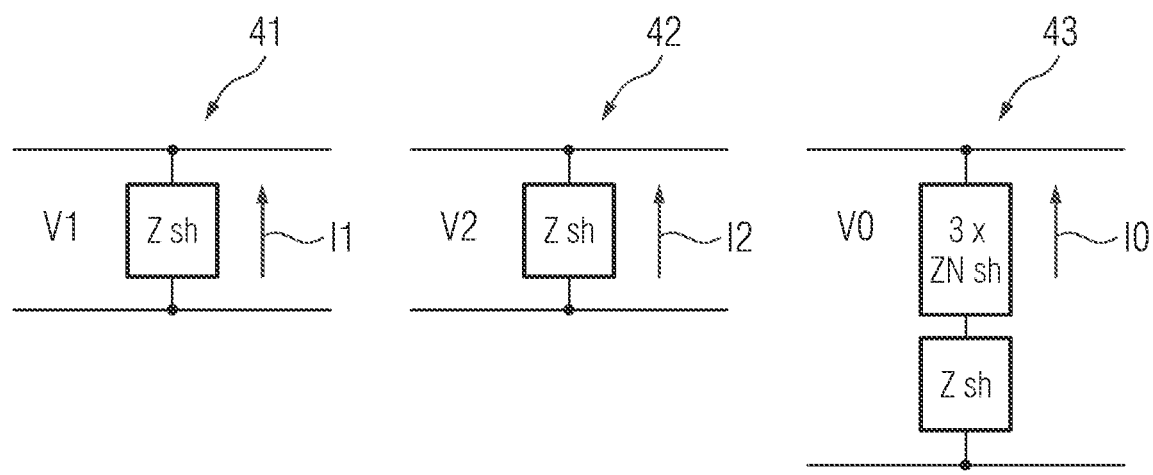
FIG. 3 is an equivalent circuit diagram for showing symmetrical components.

FIG. 3 shows, by way of example, equivalent circuit diagrams 41-43 for the symmetrical components positive phase-sequence system, negative phase-sequence system, and zero phase-sequence system, wherein the positive phase-sequence system and the negative phase-sequence system have identical impedances $Z_{SH}$, and the zero phase-sequence system is defined by $Z_{SH}+3*ZN_{SH}$. The circuit diagram 41 represents the so-called positive phase-sequence system, the circuit diagram 42 represents the negative phase-sequence system, and the circuit diagram 43 represents the zero phase-sequence system.

Figure 4:
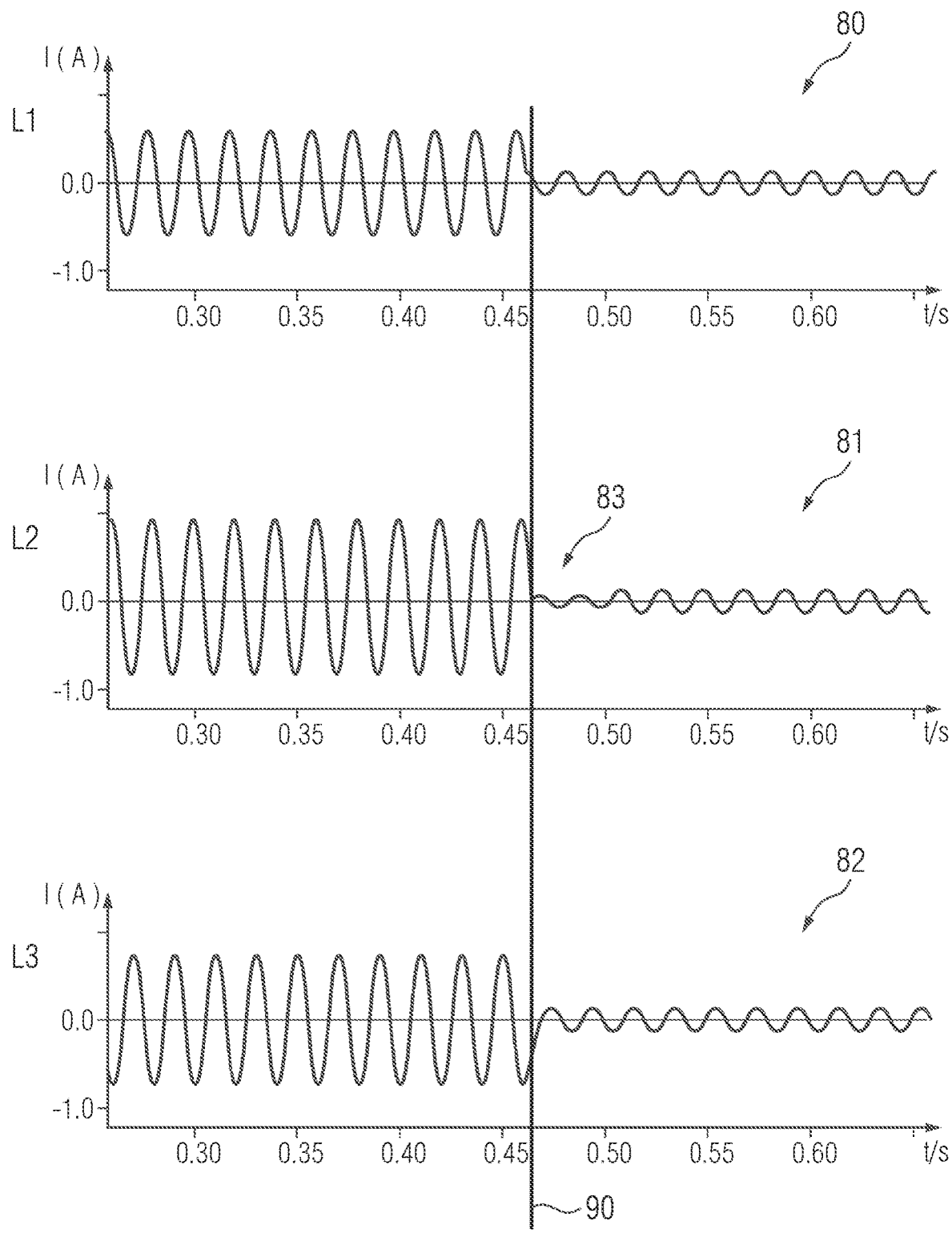
FIG. 4 is a graph showing a simulation for a three-phase current characteristic.

FIG. 4 shows in each case a characteristic for a measured resonant current 80, 81, 82 for the three phases L1, L2 and L3. In this case, at t=0 ms in the simulation, a remote short circuit has been applied on the 350 km-long line. The amplitude of the short-circuit current I (A) is in each case specified as being between 1 A and −1 A (on the secondary side, i.e. at the current transformer), wherein given a transformation ratio of the current transformer of 1000, for example, an amplitude of between 1000 A and −1000 A results on the line on the primary side.

At time 460 ms, the circuit breaker in the simulation is opened. This is characterized by the perpendicular line 90.

For a first "measurement" after 450 ms, i.e. prior to opening of the circuit breaker at approximately 460 ms, the following values result (phasor measured variables, specified in each case with absolute value (length) and angle):

| Measured value | Absolute value | Angle (°) |
|---|---|---|
| Current phase A | 417 mA | 135 |
| Current phase B | 629 mA | 89 |
| Current phase C | 519 mA | −108 |
| Voltage phase A | 60.75 V | −49 |
| Voltage phase B | 48.41 V | −169 |
| Voltage phase C | 58.07 V | 80 |

Since at this time the breaker is still closed, the measured current is not referred to as resonant current. In the following examples, after opening of the breaker, the measured current is referred to as resonant current.

The following calculated values result from the measured values:

| Calculated variable | Absolute value | Angle(°) |
|---|---|---|
| Positive phase-sequence system | 55.61 V | −46 |
| Negative phase-sequence system | 6.37 V | −86 |
| Zero phase-sequence system | 1.36 V | 36 |
| Corrected current phase A | 424 mA | 147 |
| Corrected current phase B | 696 mA | 91 |
| Corrected current phase C | 505 mA | −99 |

It can clearly be seen that the corrected current in each case deviates only a little from the measured current in terms of absolute value and phase, prior to opening of the circuit breaker.

If the measurement is repeated after opening of the circuit breaker at 500 ms, i.e. after opening of the circuit breaker, the following measured values result:

| Measured value | Absolute value | Angle (°) |
|---|---|---|
| Resonant current phase A | 89 mA | 62 |
| Resonant current phase B | 30 mA | −55 |
| Resonant current phase C | 88 mA | −170 |
| Voltage phase A | 77.98 V | −12 |
| Voltage phase B | 4.87 V | 27 |
| Voltage phase C | 76.72 V | 81 |

The following calculated values result from this:

| Calculated variable | Absolute value | Angle (°) |
|---|---|---|
| Positive phase-sequence system | 48.44 V | −25 |
| Negative phase-sequence system | 15.85 V | −85 |
| Zero phase-sequence system | 37.41 V | 34 |
| Corrected current phase A | 7 mA | −27 |
| Corrected current phase B | 3 mA | −149 |
| Corrected current phase C | 7 mA | 104 |

By virtue of the correction of the measured resonant current, very low corrected currents (below 10 mA) result which can be considered to be substantially zero (this is the expected value when the breaker is open). The corrected currents are below a typical threshold value of 50 mA which, in the case of protection devices, is considered to be a still existing current flow when the circuit breaker is closed.

Thereby, the invention enables improved identification of an open breaker for downstream protection devices.

At 550 ms, the following results:

| Measured value | Absolute value | Angle (°) |
|---|---|---|
| Resonant current phase A | 91 mA | 65 |
| Resonant current phase B | 91 mA | −54 |
| Resonant current phase C | 92 mA | −173 |
| Voltage phase A | 63.14 V | −24 |
| Voltage phase B | 60.95 V | −149 |
| Voltage phase C | 65.59 V | 96 |

The following calculated values result from this:

| Calculated variable | Absolute value | Angle (°) |
|---|---|---|
| Positive phase-sequence system | 63.17 V | −26 |
| Negative phase-sequence system | 1.74 V | −43 |
| Zero phase-sequence system | 2.85 V | 105 |
| Corrected current phase A | 7 mA | −22 |
| Corrected current phase B | 5 mA | −98 |
| Corrected current phase C | 8 mA | 113 |

By virtue of the correction of the measured resonant current, in turn very low corrected currents (below 10 mA) result which enable improved fault identification in the protective equipment.

The invention claimed is:

1. A method for protecting lines, which comprises the steps of:
    providing a reactor device for reactive power compensation on an electrical line;
    measuring a resonant current on a line side of the reactor device with a first measuring device after an opening of a circuit breaker;
    measuring a voltage with a second measuring device after the opening of the circuit breaker; and
    calculating a calculated current in the reactor device using an evaluation device on a basis of a measured voltage, and the calculated current is subtracted from the resonant current by the evaluation device in order to obtain a corrected current.

2. The method according to claim 1, wherein the corrected current is used by a protection device as an input variable for line protection functions.

3. The method according to claim 2, which further comprises using a threshold value for determining an open state of the circuit breaker for the protection device, wherein the threshold value is lower than in a case of use of the resonant current as the input variable.

4. The method according to claim 1, wherein a main reactor shunt and a neutral reactor shunt are used for the reactor device.

5. The method according to claim 1, which further comprises determining the current in the reactor device for each phase in each case by an analysis of symmetrical components.

6. A protection assembly for protecting lines including an electrical line, the protection assembly comprising:
    a reactor device for reactive power compensation;
    a circuit breaker for connecting or disconnecting the electrical line;
    a first measuring device, disposed on a line side of said reactor device, for measuring a resonant current flowing after an opening of said circuit breaker;
    a second measuring device configured to measure a voltage after the opening of said circuit breaker; and
    an evaluation device configured to calculate a calculated current in said reactor device on a basis of a measured voltage, and to subtract the calculated current from a measured resonant current in order to obtain a corrected current.

7. The protection assembly according to claim 6, further comprising a protection device configured to use the corrected current as an input variable for line protection functions.

8. The protection assembly according to claim 7, wherein said protection device is configured to use a threshold value for determining an open state of said circuit breaker, wherein the threshold value is lower than in a case of a use of the measured resonant current as the input variable.

9. The protection assembly according to claim 6, wherein said reactor device has a main reactor shunt and a neutral reactor shunt.

10. The protection assembly according to claim 6, wherein the current in said reactor device is determined by means of said evaluation device for each phase in each case by an analysis of symmetrical components.

* * * * *